United States Patent [19]

Bender et al.

[11] Patent Number: 5,262,186
[45] Date of Patent: Nov. 16, 1993

[54] PROCESS FOR TREATING FISH AND SHELLFISH TO CONTROL BACTERIAL CONTAMINATION AND/OR GROWTH

[75] Inventors: Fredric G. Bender, Houston; Eugene Brotsky, Pittsburgh, both of Pa.

[73] Assignee: Rhone Poulenc Specialty Chemicals Co., Cranbury, N.J.

[21] Appl. No.: 33,977

[22] Filed: Mar. 19, 1993

Related U.S. Application Data

[63] Continuation of Ser. No. 931,264, Aug. 17, 1992, abandoned, which is a continuation-in-part of Ser. No. 712,256, Jun. 7, 1991, abandoned.

[51] Int. Cl.$^5$ .............................................. A23B 4/02
[52] U.S. Cl. .................................. 426/332; 426/532; 426/643
[58] Field of Search .................... 426/332, 424, 643

[56] References Cited

U.S. PATENT DOCUMENTS

| | | |
|---|---|---|
| Re. 30,023 | 6/1979 | Hawley et al. |
| 1,774,310 | 8/1930 | Bates |
| 2,770,548 | 11/1956 | Hall et al. |
| 2,957,770 | 10/1960 | Freund et al. |
| 3,493,392 | 2/1970 | Swartz |
| 3,615,686 | 10/1971 | England |
| 3,620,767 | 11/1971 | Swartz |
| 3,681,091 | 8/1972 | Kohl et al. |
| 3,705,040 | 12/1972 | Bynagte |
| 3,726,962 | 4/1973 | Vanstrom et al. |
| 3,775,543 | 11/1973 | Zyss |
| 3,782,975 | 1/1974 | Zyss |
| 3,989,851 | 11/1976 | Hawley et al. |
| 4,071,635 | 1/1978 | Lindl et al. |
| 4,075,357 | 2/1978 | Szczesniak et al. |
| 4,168,322 | 9/1979 | Buckley et al. |
| 4,293,578 | 10/1981 | Stone |
| 4,382,098 | 5/1983 | Bolin et al. |
| 4,407,831 | 10/1983 | Swartz |
| 4,431,679 | 2/1984 | Crawford |
| 4,517,208 | 5/1985 | Crawford |
| 4,592,892 | 6/1986 | Ueno et al. |
| 4,683,139 | 7/1987 | Cheng |
| 4,781,934 | 11/1988 | Shimp et al. |
| 4,810,514 | 3/1989 | Guenther |
| 5,069,922 | 12/1991 | Brotsky et al. |
| 5,196,221 | 3/1993 | Montville ............ 426/332 |

FOREIGN PATENT DOCUMENTS 847280 7/1970 Canada.
935413 8/1963 United Kingdom.

OTHER PUBLICATIONS

"Effects of Type and Concentration of Phosphate and Amount of Salt and Brine on WHC, Color and Consistency of Cooked Meat Products," G. Barbieri, et al., Industria Conserve 1989, 64:313.

"The Influence of Scald Water pH on the Death Rates of *Salmonella typhimurium* and Other Bacteria Attached to Chicken Skin," T. J. Humphrey, et al., Journal of Applied Bacteriology 1984, 57(2), pp. 355–359.

"The Effect on pH Adjustment on the Microbiology of Chicken Scald-tank Water with Particular Reference to the Death Rate of Salmonellae," T. J. Humphrey, et al., Journal of Applied Bacteriology 1981, 51, pp. 517–527.

"Phosphate and Heat Treatments to Control Salmonella and Reduce Spoilage and Rancidity on Broiler-Carcasses," J. E. Thompson, et al., Poultry Science 1979, 58, pp. 139–143.

*Chemical Pasteurization of Poultry Meat*, J. S. Teotia, Dissertation Abstracts Int'l. B. 1974, 34(a), p. 4142.

"Polyphosphate Use in Meat and Other Muscle Foods," Eugene Brotsky, et al., Proceedings of the Meat Industry Research Conference 1973, pp. 107–118.

*the Antimicrobial Effect of Phosphate With Particular Reference to Food Products*, L. L. Hargreaves, et al., The British Food Manufacturing Industries Research Association, Scientific and Technical Surveys, No. 76, Apr. 1972, pp. 1–20, at 12.

Grant, Hackh's Chemical Dictionary, 4th edition, McGraw Hill Company, New York, 1969, p. 514.

*Bacteriolytic Action of Phosphates*, G. Pacheco, et al., Mems Institute Oswaldo Cruz, 52(2), pp. 405–414.

"Chemicals Used in Food Products," National Academy of Sciences, National Research Counsel, Publication 1274 (1965).

*Primary Examiner*—Carolyn Paden
*Attorney, Agent, or Firm*—Scully, Scott, Murphy & Presser

[57] ABSTRACT

Fish or shellfish is treated with an alkali metal orthophosphate to reduce, remove, retard or control bacteria without causing organoleptic depreciation.

10 Claims, No Drawings

PROCESS FOR TREATING FISH AND SHELLFISH TO CONTROL BACTERIAL CONTAMINATION AND/OR GROWTH

This is a continuation of copending application Ser. No. 931,264 filed on Aug. 17, 1991, now abandoned, which is a continuation-in-part of application Ser. No. 712,256, filed on Jun. 7, 1991, now abandoned.

The present invention relates to an improved process for reducing, removing or retarding bacterial contamination and/or growth of bacteria on fish and shellfish, both fresh and salt water varieties.

BACKGROUND OF THE INVENTION

In processing fish, fish are taken from the ocean or fresh water and eviscerated often with filleting. In this process, the fish can become contaminated with certain bacterial or may naturally have such bacteria on the skin. Shellfish is often just cooked and the shell removed.

Bynagte, U.S. Pat. No. 3,705,040, treats shellfish, particularly shrimp, with a solution of water, acid pyrophosphate and tripolyphosphate or metaphosphate or hexametaphosphate or trimetaphosphate or sodium orthophosphate for a period of two minutes followed by cooking at least 2 minutes, cooling and shell removal. The phosphates are thought to make removal of the meat from the shell easier.

Swartz, U.S. Pat. Nos. 3,493,392 and 3,620,767, and Canadian Patent No. 847,280, teaches treating frozen tuna or frozen bonito with phosphate prior to cooking to increase the yield of light meat. The treatment solution is pumped into the fish in much the same way as with hams and the like.

Kohl, et al., U.S. Pat. No. 3,681,091, teaches treating foods, including fish fillet, with 10% solutions of medium chain length polyphosphates.

Other patents teach treating meats with orthophosphates combined with other phosphates and salts to improve taste and texture. For example, U.S. Pat. No. 3,782,975, to Zyss the primal cuts are maintained between 32° F. and 42° F. for about 3 to 5 days. During that period the sodium nitrite reacts with the myoglobin of the meat to form nitrosomyoglobin which insures good color. The addition of the curing solution to the primal cuts imparts improved texture and tenderness that would be lacking if the brine was not added to the meat. Zyss teaches that for people with a sodium problem that a pumping solution of potassium salts including potassium orthophosphate, could be employed.

A second patent to Zyss, U.S. Pat. No. 3,775,543, suggests the addition of potassium phosphate compositions including potassium orthophosphate to processed meats as a binding agent in from 0.2% to 2.0% by weight of the food mix being processed. Zyss clearly avoids alkaline pH since alkaline pH decreases the shelf life. Zyss neutralizes with acid to pH 6.4 to 6.8. In Example II, Zyss prepares a bologna product using about 1% tripotassium orthophosphate.

Ueno, et al., U.S. Pat. No. 4,592,892, uses ethanol to sterilize certain food including various fishes and raw seafood and processing machinery and may employ a carbonate and/or trialkali phosphate combined with the ethanol to enhance the ethanols effectiveness.

Freund, et al., U.S. Pat. No. 2,957,770, teaches improving the properties of meat with a casein composition which can include inorganic orthophosphates such as disodium hydrogen orthophosphate.

Cheng, U.S. Pat. No. 4,683,139, teaches a process for prepackaged fresh meat at retail wherein the shelf life of the meat is increased by treatment with an aqueous solution of an alkali metal salt of certain phosphate compounds, a reducing compound such as ascorbic acid and a sequestering or chelating agent such as citric acid. The phosphate can be an orthophosphate, pyrophosphates, tripolyphosphates and hexametaphosphates and will vary in the way the buffer solution is applied to the meat giving a pH below neutral.

Szczesniak, et al., U.S. Pat. No. 4,075,357, teaches salt combined with a secondary salt selected from alkali metal salts of organic acids and trisodium orthophosphate, polyphosphate, metaphosphate and ultraphosphate. Citrates are preferred combined with sodium chloride. These mixtures are used to control water activity in intermediate moisture cooked food.

Many treatment systems for poultry have been suggested. It has been reported that the thermal death rate of salmonellae can be increased during scalding by elevating the pH of the scald water to pH $9.0 \pm 0.2$. Agents such as sodium hydroxide, potassium hydroxide, sodium carbonate, and trisodium phosphate have been reported as effective pH adjusting agents for use in increasing the thermal death rate of the bacteria. Trisodium phosphate was reported as least effective in increasing the death rate. See "The Effect on pH Adjustment on the Microbiology of Chicken Scald-tank Water With Particular Reference to the Death Rate of Salmonellae", T. J. Humphrey, et al., Journal of Applied Bacteriology 1981, 51, pp. 517-527.

T. J. Humphrey, et al., have also reviewed the pH effect of scald water on Salmonella on chicken skin. See "The Influence of Scald Water pH on the Death Rates of *Salmonella typhimurium* and Other Bacteria Attached to Chicken Skin", Journal of Applied Bacteriology 1984, 57 (2), pp. 355-359. Scald water adjusted to pH $9.0 \pm 0.2$ as in the 1981 paper can help to reduce external and internal cross-contamination of carcasses by salmonella.

"Phosphate and Heat Treatments to Control Salmonella and Reduce Spoilage and Rancidity on Broiler Carcasses", J. E. Thompson, et al., Poultry Science, 1979, 58, 139-143 teach Kena phosphate, a blend of 90% sodium tripolyphosphate and 10% sodium hexametaphosphate, did not consistently or affectively change either salmonella survival or total bacterial count.

Attempts have been made to pasteurize poultry meat by treating the meat with a solution containing agents such as lactic acid, acetic acid, sodium carbonate, sodium borate, sodium chloride, potassium hydroxide, chlorine and EDTA. All treatments, except sodium borate, sodium chloride, and sodium carbonate, reduced the visual acceptability of the meat. Chlorine failed to destroy bacteria on the surface of the poultry but would be expected to control salmonellae in water. See *Chemical Pasteurization of Poultry Meat*, J. S. Teotia, Disseration Abstracts Intl. B., 1974, 34(a), 4142.

It is known that the shelf life of chicken carcasses can be increased 1 to 2 days by chilling the poultry in a solution of 6% sodium tripolyphosphate/0.7% sodium acid pyrophosphate (Kena—a trademark of Rhone Poulenc, Inc.). See *The Antimicrobial Effect of Phosphate With Particular Reference To Food Products*, L. L. Hargreaves, et al., The British Food Manufacturing Industries Research Association, Scientific and Technical Surveys, No. 76, April 1972, pp. 1-20 at p. 12. Many patents and articles suggest the use of polyphosphates in preserving meat and fish products.

In addition, it is also stated in the Hargreaves reference at p. 7 that G. Pacheco and V. M. Dias is an article entitled *Bacteriolytic Action of Phosphates,* Mems Institute Oswaldo Cruz, 52 (2) pp. 405-414, reported on the bacteriolytic action of solutions of monosodium, disodium, trisodium and dipotassium orthophosphates on dead and living cells of *Salmonella typhosa, Escherichia coli and Staphylococcus aureus*. Trisodium phosphate dodecahydrate is stated to have the greatest lytic action. The reference does not relate to treating meat or fish.

British patent 935,413 teaches treating raw poultry in the chill tank with a non-cyclic polyphosphate. It is taught that this method provides increased preservation of the poultry flesh by decreasing exudate and thereby decreasing spread of bacteria.

Trisodium phosphate has also been found to be effective in inhibiting the growth of blue mold in cuts and bruises in fruit by treating the broken surface with the solution of trisodium phosphate (U.S. Pat. No. 1,774,310).

Trisodium orthophosphate is also a known and widely used anticaking agent (see U.S. Pat. No. 2,770,548).

Trialkali metal orthophosphate has been found by us to effectively reduce salmonella in chicken in application Ser. No. 530,131, now U.S. Pat. No.5,069,922 and also in allowed application Ser. No. 716,260, filed Jun. 7, 1991 (no patent number issued). It is also found to be effective on red meat as disclosed in pending application Ser. Number 712,245, filed Jun. 7, 1991.

SUMMARY OF THE PRESENT INVENTION

In accordance with the present invention, there is provided a process for treating raw fish and/or shellfish with trialkali metal orthophosphate to reduce, remove or retard bacterial contamination and/or growth. Specifically, the process is achieved by treating the surface of the fish, just after evisceratimn with a treatment solution above pH 11.5 which comprises about 3%, preferably from about 4% to saturation of a solution of the alkali metal orthophosphate for a period of time effective to reduce, remove or retard the growth of seafood spoilage microorganisms, such as, Pseudomonas aeruginosa, Bacillus Cereus, Moraxella osloensis and the like. Shellfish are treated in a similar manner.

By the use of this process, fish and shellfish can be washed economically and simply with food grade products to achieve bacterial control without organoleptic depreciation of the fish or shellfish. Phosphate salt can remain on the fish surface to provide a surface much less conducive to supporting bacterial growth.

Other benefits will become apparent from the description which follows.

DETAILED DESCRIPTION OF THE INVENTION

Trialkali metal phosphate is an orthophosphate salt of the formula $R_3PO_4$ with a formula for sodium salt being $Na_3PO_4$ and an equivalent formula for the tripotassium compound. R is an alkali metal of sodium or potassium. Trisodium phosphate has a minimum of 41.5% $P_2O_5$ and a typical pH in 1% solution of about 11.8.

Trisodium phosphate is available as the dodecahydrate and in commerce the dodecahydrate is available in technical or food grade. Preferably, the dodecahydrate (water form) is used. As used herein, trisodium phosphate as well as all forms of those compounds.

The invention is applicable to any fish or shellfish from salt or fresh water either in whole, eviscerated, or filleted condition.

Fishes include bony and cartilaginous such as flounder and shark respectively; fresh water fish such as trout; salt water fish such as grouper; mixed water fish such as salmon and the like. Fishes also includes aqua cultural fish such as catfish.

Shellfish includes crayfish, prawns, crabs and lobsters both aquacultural and wild and caught from either a fresh, brackish or salt water habitat. Fish and shellfish also includes bivalve mollusks such as scallops, oysters and mussels, as well as, univalve mollusks such as conch. Also included are other marine species such as squid.

The fish and shellfish can be treated with the trialkali metal orthophosphate at any stage of processing, such as during shell, skeleton, head, viscera, scale or skin removal or prior to, during or after freezing, refrigeration, icing, ice glazing, cooking or pasteurization. Preferably the fish and shellfish is treated either just after catch on the fishing boat or shortly after arrival at the processing plant prior to cooking or packaging.

After the fish or shellfish is caught it is eviscerated, often skinned or filleted and washed with water or other acceptable cleaning solutions. Agitation, may be applied to assist washing. Before, concurrent with or after the washing the fish or shellfish are treated with a treatment dispersion or preferably a solution containing about 3%, preferably from about 4% to saturation of trialkali metal orthophosphate. Preferably from about 6% and more preferably from about 8% to saturation of trialkali metal orthophosphate by weight of the solution is employed. From about 4% to 12% and preferably about 6% to 12% and more preferably from about 8% to 12% orthophosphate has been found effective. The fish or shellfish can be dipped in the treatment solution with agitation to insure contact of the treatment solution with all surfaces and crevices of the fish. The treatment solution is preferably applied by mechanical sprayers, under high pressure to insure good contact of treatment solution with the fish surface.

The treatment solution preferably contains only trialkali metal phosphate as the means to control, reduce, retard or remove bacteria. No alcohol, ascorbic acid or other phosphates except those normally present in salt water at about the concentration normally present in salt water are employed in the treatment solution. The treatment solution may contain other ingredients for preservation, water holding, cleaning, flavoring, coloring, including salts such as sodium and potassium chlorides and the like. Often the solution may be prepared from salt water. In the treating on fish or shellfish, the solution comprises trialkali metal orthophosphate with the proviso that it contains no alcohol, ascorbic acid or other phosphates.

The treatment solution preferably contains the orthophosphate in an amount sufficient to provide and maintain a pH above about 11.5 and preferably within a range from 11.6 to 13.5 and most preferably from pH 12.0 to 13.5.

The treatment solution is employed before, during, or after evisceration. We prefer to employ the treatment solution after evisceration and during washing or after washing the flesh. While any temperature application is possible, it is preferred to treat the fish or shellfish at about the temperature of the fish being treated. In most cases the treatment solution temperature is equal to or below 40° F., preferably around ice temperature of about 35° F.

It is also possible to treat the fish or shellfish during or after cooking to control, reduce, remove or retard bacterial contamination and/or growth.

The fish flesh or skin is contacted with treatment solution for a period of time sufficient to remove, retard or reduce bacterial contamination and/or growth over and above that attainable using pure water. Treatment dwell time is sufficient under conditions of treatment, to contact all contactable exposed surfaces of the fish or shellfish, effecting the washing of the surfaces. If desired, a layer of orthophosphate may be left on the fish to prevent or retard further bacterial growth or contamination provided the orthophosphate does not result in organoleptic depreciation.

At atmospheric pressure, in a tank or other dipping device, dwell times at 5 seconds to about 30 minutes are effective while dwell times using a spray range from several seconds to several minutes or 2 seconds to about 5 minutes with spray times of less than 30 seconds preferred.

A high pH maintained at over 11.5, preferably 12.0 or greater is critical to remove, reduce, retard or control bacterial contamination and/or growth. The mechanism is not entirely understood but the orthophosphate treatment appears to improve bacteria removal as well as retarding growth of any residual bacteria.

In a preferred embodiment of this invention the fish is treated with trialkali metal orthophosphate prior to pumping the fish with polyphosphate to retain moisture, tenderness and the like. The trialkali metal orthophosphate prevents bacteria present on the skin or flesh from being driven into the fish during pumping which could result in later spoilage. By treating the surface first with orthophosphate any bacteria are removed or controlled prior to the pumping operation.

Immediately after treatment the fish or shellfish may be processed by the usual procedures. If a high level of orthophosphate is present, it can be removed by washing with water and/or neutralized with acid. In general it is preferred to leave residential orthophosphate on the raw fish or shellfish to further protect against bacteria growth or contamination.

We have found the trialkali metal orthophosphate is effective against *Pseudomonas aeruginosa, Bacillus cereus, Moraxella osloensis* and other similar bacteria.

EXAMPLE

Tests were made to determine the antimicrobial effectiveness of trisodium orthophosphate (TSP) on the survival of several typical seafood spoilage bacteria in laboratory model systems.

EXPERIMENTAL APPROACH

A. Test Variables

Two different test systems (i.e. water systems) were used to evaluate the efficacy of two different chemical additives which were labeled "Agent A" (100% TSP) and "Agent B" (50% TSP +50% KCl). One water system was formulated as a sterile synthetic sea water according to the following formula.

| Chemical | Percent |
|---|---|
| NaCl | 2.348 |
| $MgCl_2 \times 6H_2O$ | 1.065 |
| $Na_2SO_4$ | 0.392 |
| $CaCl_2 \times 2H_2O$ | 0.146 |
| KCl | 0.066 |
| $H_2O$ | 95.980 |
| Total | 100.000 |

The second water system was comprised of sterile deionized water, and represents fresh water. The concentration of Agent A and Agent B that was added to separate sea water systems for evaluation was 0.5% (w/v). The concentration of Agents A and B that was added to separate fresh water systems was 3.0% (w/v).

B. Test Microorganisms

For the purpose of this evaluation, three commonly identified seafood spoilage microorganisms were utilized.

They included:
*Pseudomonas aeruginosa*
*Bacillus cerus*
*Moraxella osloensis*

The antimicrobial efficacy of each chemical additive in each water system was evaluated against 24 hour cultures of the first two strains, and 48 hour cultures were evaluated for the slower growing Moraxella species.

C. Test Procedure

Ninety nine ml volumes of the test water systems with the appropriate concentrations of Agents A or B in 250 ml Erlenmeyer flasks were tempered to a constant temperature of 27° C. in a water bath. Each flask was inoculated individually with one ml of the test culture. Target inoculum level was $1.0 \times 10^8$ cfu/ml, to yield a flask inoculum level of $1.0 \times 10^6$ cfu/ml.

The flasks were agitated and a 1 ml time zero sample was removed into a 9 ml neutralization blank. After 60 seconds of contact time another 1 ml sample was removed into a second 9 ml neutralization blank. Samples were plated in triplicate using serial dilutions. The spread plate method was used for *P. aeruginosa* and pour plate method was used for the other two test strains. Each trial was run in duplicate, and a time zero culture control was included for each trial.

RESULTS AND DISCUSSION

The results of experiments evaluating the effect of Agents A and B against *P. aeruginosa* at 27° C. are presented in Tables 1 and 3. The percent reductions of the bacterial populations after treatment with these agents are presented in Tables 2 and 4.

TABLE 1

Recovery of *P. aeruginosa* after Treatment with Agent A in Fresh Water (3.0%) and Synthetic Sea Water (0.5%) systems.

| | | Initial Inoculum | Replicate A | Replicate B |
|---|---|---|---|---|
| Fresh Water | T = 0 | $6.8 \times 10^8$[a] | $<1.0 \times 10^3$[a] | $<1.0 \times 10^3$ |
| | T = 60 | | $<1.0 \times 10^3$ | $<1.0 \times 10^3$ |
| Sea Water | T = 0 | $5.1 \times 10^4$ | $3.9 \times 10^8$ | $5.5 \times 10^8$ |
| | T = 60 | | $1.1 \times 10^a$ | $9.2 \times 10^7$ |

[a]cfu/ml

TABLE 2

Percent Reduction of *P. aeruginosa* after Treatment with Agent A in Fresh Water (3.0%) and Synthetic Sea Water (0.5%) Systems.

| | | Initial Inoculum | Replicate A | B | Average |
|---|---|---|---|---|---|
| Fresh Water | T = 0 | 6.8 × 10⁸[a] | >99.994[b] | >99.994 | >99.994 |
| | T = 60 | | >99.994 | >99.994 | >99.994 |
| Sea Water | T = 0 | 5.1 × 10⁸ | 42.6 | 19.1 | 30.9 |
| | T = 60 | | 83.8 | 86.5 | 85.2 |

[a]cfu/ml
[b]%

TABLE 3

Recovery of *P. aeruginosa* after Treatment with Agent B in Fresh Water (3.0%) and Synthetic Sea Water (0.5%) Systems.

| | | Initial Inoculum | Replicate A | B |
|---|---|---|---|---|
| Fresh Water | T = 0 | 6.0 × 10⁸[a] | <1.0 × 10³[a] | <1.0 × 10³ |
| | T = 60 | | <1.0 × 10³ | <1.0 × 10³ |
| Sea Water | T = 0 | 4.5 × 10⁸ | 3.0 × 10⁸ | 4.2 × 10⁸ |
| | T = 60 | | 3.4 × 10⁸ | 3.6 × 10⁸ |

[a]cfu/ml

TABLE 4

Percent Reduction of *P. aeruginosa* after Treatment with Agent B in Fresh Water (3.0%) and Synthetic Sea Water (0.5%) Systems.

| | | Initial Inoculum | Replicate A | B | Average |
|---|---|---|---|---|---|
| Fresh Water | T = 0 | 6.0 × 10⁸[a] | >99.994[b] | >99.994 | >99.994 |
| | T = 60 | | >99.994 | >99.994 | >99.994 |
| Sea Water | T = 0 | 4.5 × 10⁸ | 33.3 | 24.4 | 28.9 |
| | T = 60 | | 7.1 | 20.0 | 13.6 |

[a]cfu/ml
[b]%

Both Agent A and Agent B were effective at the 3.0% level in the fresh water systems, showing a >99.994% reduction for both T=0 and T=60 seconds. At the 0.5% level in sea water, Agent A was minimally effective, showing an average reduction of 30.9% at T=0. Agent A was more effective at T=60 seconds (avg. reduction 85.2%). Agent B was even less effective in sea water showing an average initial reduction of 28.9% and an average reduction of only 13.6% after 60 seconds contact time.

The effects of Agents A and B on *B. cereus* are presented in Tables 5 and 7. Tables 6 and 8 show the percent reduction of *B. cereus* in these lab model systems.

TABLE 5

Recovery of *B. cereus* after Treatment with Agent A in Fresh Water (3.0%) and Synthetic Sea Water (0.5%) Systems.

| | | Initial Inoculum | Replicate A | B |
|---|---|---|---|---|
| Fresh Water | T = 0 | 4.0 × 10⁷[a] | 1.6 × 10⁵[a] | 6.6 × 10⁴ |
| | T = 60 | | 5.9 × 10⁴ | 3.3 × 10⁴ |
| Sea Water | T = 0 | 4.0 × 10⁷ | 3.2 × 10⁷ | 3.3 × 10⁷ |
| | T = 60 | | 2.9 × 10⁷ | 3.1 × 10⁷ |

[a]cfu/ml

TABLE 6

Percent Reduction of *B. cereus* after Treatment with Agent A in Fresh Water (3.0%) and Synthetic Sea Water (0.5%) Systems.

| | | Initial Inoculum | Replicate A | B | Average |
|---|---|---|---|---|---|
| Fresh Water | T = 0 | 4.0 × 10⁷[a] | 99.6[b] | 99.8 | 99.7 |
| | T = 60 | | 99.9 | 99.9 | 99.9 |
| Sea Water | T = 0 | 4.0 × 10⁷ | 20.0 | 17.5 | 18.8 |
| | T = 60 | | 27.5 | 22.5 | 25.0 |

[a]cfu/ml
[b]%

TABLE 7

Recovery of *B. cereus* after Treatment with Agent B in Fresh Water (3.0%) and Synthetic Sea Water (0.5%) Systems.

| | | Initial Inoculum | Replicate A | B |
|---|---|---|---|---|
| Fresh Water | T = 0 | 3.4 × 10⁷[a] | 1.3 × 10⁴[a] | 1.8 × 10⁴ |
| | T = 60 | | 9.0 × 10³ | 1.0 × 10⁴ |
| Sea Water | T = 0 | 3.4 × 10⁷ | 2.8 × 10⁷ | 3.0 × 10⁷ |
| | T = 60 | | 2.5 × 10⁷ | 2.6 × 10⁷ |

[a]cfu/ml

TABLE 8

Percent Reduction of *B. cereus* after Treatment with Agent B in Fresh Water (3.0%) and Synthetic Sea Water (0.5%) Systems.

| | | Initial Inoculum | Replicate A | B | Average |
|---|---|---|---|---|---|
| Fresh Water | T = 0 | 3.4 × 10⁷[a] | 99.96[b] | 99.95 | 99.96 |
| | T = 60 | | 99.97 | 99.97 | 99.97 |
| Sea Water | T = 0 | 3.4 × 10⁷ | 17.7 | 11.8 | 14.8 |
| | T = 60 | | 26.5 | 23.5 | 25.0 |

[a]cfu/ml
[b]%

In the fresh water system (3.0%) Agents A and B both gave a high percentage of reduction at T=0 (99.7 and 99.96 respectively). The reduction at T=60 was 99.9% for Agent A and 99.97% for Agent B for this system. Both were much less effective in the sea water systems (0.5%) showing less than 30% reduction at both times for both agents.

The results of experiments evaluating the effectiveness of Agent A and Agent B against *M. osloensis* at 27° C. are shown in Tables 9 and 11. The percent reduction of bacterial populations after contact with Agents A and B are shown in Tables 10 and 12.

TABLE 9

Recovery of *M. osloensis* after Treatment with Agent A in Fresh Water (3.0%) and Synthetic Sea Water (0.5%) Systems.

| | | Initial Inoculum | Replicate A | B |
|---|---|---|---|---|
| Fresh Water | T = 0 | 1.7 × 10⁷[a] | 9.2 × 10⁶[a] | 1.1 × 10⁷ |
| | T = 60 | | 1.9 × 10³ | 1.0 × 10³ |
| Sea Water | T = 0 | 1.7 × 10⁷ | 1.2 × 10⁷ | 1.3 × 10⁷ |
| | T = 60 | | 1.3 × 10⁷ | 1.3 × 10⁷ |

TABLE 10

Percent Reduction of *M. osloensis* after Treatment with Agent A in Fresh Water (3.0%) and Synthetic Sea Water (0.5%) Systems.

| | | Initial Inoculum | Replicate A | B | Average |
|---|---|---|---|---|---|
| Fresh Water | T = 0 | 1.7 × 10$^{7a}$ | 45.9$^b$ | 35.35 | 40.6 |
| | T = 60 | | 99.994 | 99.994 | 99.994 |
| Sea Water | T = 0 | 1.7 × 10$^7$ | 29.4 | 23.5 | 26.5 |
| | T = 60 | | 23.5 | 23.5 | 23.5 |

$^a$cfu/ml
$^b$%

TABLE 11

Recovery of *M. osloensis* after Treatment with Agent A in Fresh Water (3.0%) and Synthetic Sea Water (0.5%) Systems.

| | | Initial Inoculum | Replicate A | B |
|---|---|---|---|---|
| Fresh Water | T = 0 | 9.9 × 10$^{6a}$ | 4.2 × 10$^{6a}$ | 4.9 × 10$^6$ |
| | T = 60 | | <1.0 × 10$^3$ | 2.0 × 10$^3$ |
| Sea Water | T = 0 | 9.8 × 10$^6$ | 7.0 × 10$^6$ | 7.7 × 10$^6$ |
| | T = 60 | | 6.9 × 10$^6$ | 6.6 × 10$^6$ |

$^a$cfu/ml

TABLE 12

Percent Reduction of *M. osloensis* after Treatment with Agent B in Fresh Water (3.0%) and Synthetic Sea Water (0.5%) Systems.

| | | Initial Inoculum | Replicate A | B | Average |
|---|---|---|---|---|---|
| Fresh Water | T = 0 | 9.8 × 10$^{6a}$ | 57.1$^b$ | 50.0 | 53.6 |
| | T = 60 | | >99.94 | 99.98 | |
| Sea Water | T = 0 | 9.8 × 10$^6$ | 28.6 | 21.4 | 25.0 |
| | T = 60 | | 29.6 | 32.7 | 31.2 |

$^a$cfu/ml
$^b$%

The initial reduction was only approximately 50% for both agents at the 3.0% level in the fresh water system. After sixty seconds the percent reduction was >99.98 for both agents. Initially, Agent B showed a slightly greater reduction than Agent A. In the sea water systems these agents were unable to produce a reduction of more than 30%.

SUMMARY

Overall, both Agents A and B at the 3.0% level in fresh water caused a reduction of >99.6% for all bacteria tested after sixty seconds contact time. Both agents at this level caused >99.6% reduction initially for *P. aeruginosa* and *B. cereus*. The Moraxella strain used was less affected by these Agents at T=0.

The systems with 0.5% agent added to synthetic sea water produced a reduction of less than 31% in all but the T=60 trial against *P. aeruginosa*.

Trisodium orthophosphate either per se or in combination with other ingredients seems to have great potential for use in eliminating spoilage bacteria during processing of raw fish and shellfish.

What is claimed is:

1. A process for treating fish and shellfish comprising treating the surface only of fish and shellfish with a treatment solution comprising tri-alkali metal orthophosphate at a pH of 11.6 to 13.5 in an amount of about 3% to saturation of water and for a time effective to retard, reduce, or remove bacterial contamination and/or growth without organoleptic depreciation with the proviso that the treatment solution does not contain alcohol, ascorbic acid or other phosphates except those normally preset in salt water about the concentration normally present in salt water when salt water is used to prepare the treatment solution.

2. The process as recited in claim 1 wherein the fish and shellfish is eviscerated and said orthophosphate is trisodium orthophosphate and the amount of orthophosphate is about 4% to saturation in water.

3. The process as recited in claim 2 wherein the time of treatment is up to 30 minutes.

4. The process as recited in claim 3 wherein the treatment solution is sprayed on the fish or shellfish in 2 seconds to 15 minutes.

5. The process as recited in claim 1 in which the fish or shellfish is treated with a sea water solution of at least 3% trisodium orthophosphate at the point of catch.

6. The process as recited in claim 1 in which the treatment solution pH ranges from 12.0 to 13.5.

7. The process as recited in claim 1 in which the temperature of the treatment solution is equal or less than 40° F.

8. The process as recited in claim 1 in which the fish and shellfish is eviscerated and the treatment solution contains other ingredients for preservation, water holding, cleaning, flavoring, coloring, and the like.

9. The process as recited in claim 1 wherein treatment is followed by conventional processing of the fish or shellfish.

10. The prodct produced by the process of claim 1.

* * * * *

UNITED STATES PATENT AND TRADEMARK OFFICE
CERTIFICATE OF CORRECTION

PATENT NO. : 5,262,186
DATED : November 16, 1993
INVENTOR(S) : Fred Bender, et al.

It is certified that error appears in the above-indentified patent and that said Letters Patent is hereby corrected as shown below:

Column 3, line 42: "evisceratimn" should read --evisceration--

Column 6, line 62: "108a" should read --$10^{8a}$--

Column 6, lines 65 & 66: "$10^a$" should read --$10^8$--

Column 10, line 17, Claim 1: "of" should read --in--

Column 10, line 22, Claim 1: "preset" should read --present--

Column 10, line 50, Claim 10: "prodct" should read --product--

Signed and Sealed this

Sixth Day of September, 1994

Attest:

BRUCE LEHMAN

Attesting Officer          Commissioner of Patents and Trademarks